United States Patent
Burich (10) Patent No.: US 7,024,391 B2
(45) Date of Patent: Apr. 4, 2006

(54) SYSTEM, METHOD AND PROGRAM PRODUCT FOR SHARING INFORMATION

(75) Inventor: Joseph A. Burich, Sun Prairie, WI (US)

(73) Assignee: Kraft Foods Holdings, Inc., Northfield, IL (US)

( * ) Notice: Subject to any disclaimer, the term of this patent is extended or adjusted under 35 U.S.C. 154(b) by 841 days.

(21) Appl. No.: 09/730,144

(22) Filed: Dec. 5, 2000

(65) Prior Publication Data
US 2002/0069175 A1  Jun. 6, 2002

(51) Int. Cl.
*G06F 17/60* (2006.01)
(52) U.S. Cl. ............................. 705/51; 705/26; 705/1; 705/52; 707/10
(58) Field of Classification Search ............ 705/50–80, 705/28, 29, 1, 26, 7, 27; 707/10
See application file for complete search history.

(56) References Cited

U.S. PATENT DOCUMENTS

| | | | |
|---|---|---|---|
| 5,241,671 A | 8/1993 | Reed et al. | |
| 5,553,277 A | 9/1996 | Hirano et al. | |
| 5,706,498 A | 1/1998 | Fujimiya et al. | |
| 5,745,895 A | 4/1998 | Bingham et al. | |
| 5,778,381 A | 7/1998 | Sandifer | |
| 5,781,773 A | 7/1998 | Vanderpool et al. | |
| 5,842,178 A | 11/1998 | Giovannoli | |
| 5,913,210 A * | 6/1999 | Call ............................. | 707/4 |
| 5,915,019 A | 6/1999 | Ginter et al. | |
| 5,950,178 A | 9/1999 | Borgato | |

(Continued)

FOREIGN PATENT DOCUMENTS

WO  WO 98/4442  * 10/1998

OTHER PUBLICATIONS

Blair, "Sharing Your Database with Cross-Platfrom and Remote Users", Jan. 22, 2000.*

(Continued)

*Primary Examiner*—James P. Trammell
*Assistant Examiner*—Jalatee Worjloh
(74) *Attorney, Agent, or Firm*—Fitch, Even, Tabin & Flannery (57) ABSTRACT

A member accessible information system for managing member information, and selectively providing member information to individual members. The members, typically belong to a common industry, such as the food industry and connect through remotely connected networked computers, such as over the Internet. Members may be food industry members include suppliers, manufacturers and customers, each accessing information supplied by members and maintained by the system. Members may search through previously authorized member provided information. The system includes a central storage which may be located on a database server and which stores product information, e.g., food product information and specifications. Members access the system through a web server. A security policy server verifies what product information and which specifications are to be available to each member. Specifications may be stored centrally or, distributed to member locations. An app server stores and selectively executes applications used by members. User security profiles are stored on and managed by a policy server. Each member's security profile indicate the level of authorization of the corresponding member. A personalization server may be included to record user member characteristics, i.e., content viewed by the member, and personalizes content to subsequently automatically make similar content available to the member. An ad server may be included to schedule, serve and track advertising content provided to members. Orders may be generated and placed automatically. Member use may be tracked to generate member bills automatically and bill individual members.

34 Claims, 6 Drawing Sheets

U.S. PATENT DOCUMENTS

| | | |
|---|---|---|
| 5,953,707 A | 9/1999 | Huang et al. |
| 5,966,712 A | 10/1999 | Sabatini et al. |
| 5,978,804 A | 11/1999 | Dietzman |
| 5,987,440 A * | 11/1999 | O'Neil et al. ............. 705/44 |
| 5,987,474 A | 11/1999 | Sandifer |
| 6,009,406 A | 12/1999 | Nick |
| 6,032,121 A | 2/2000 | Dietrich et al. |
| 6,038,566 A | 3/2000 | Tsai |
| 6,058,398 A | 5/2000 | Lee |
| 6,067,549 A | 5/2000 | Smalley et al. |
| 6,115,641 A | 9/2000 | Brown et al. |
| 6,609,115 B1 * | 8/2003 | Mehring et al. ............. 705/51 |
| 6,847,938 B1 * | 1/2005 | Moore ............. 705/26 |
| 6,901,376 B1 * | 5/2005 | Sculler et al. ............. 705/26 |
| 2001/0037283 A1 * | 11/2001 | Mullaney ............. 705/37 |
| 2001/0051978 A1 * | 12/2001 | Allen et al. ............. 709/203 |
| 2002/0082956 A1 * | 6/2002 | Peterson et al. ............. 705/28 |
| 2002/0097235 A1 * | 7/2002 | Rosenberg et al. ......... 345/204 |

OTHER PUBLICATIONS

Voth, Danna, "Managing Projects on the Web", Sep. 2000, Knowledge Management, c3 n9 p. 65.*

* cited by examiner

SYSTEM, METHOD AND PROGRAM PRODUCT FOR SHARING INFORMATION

BACKGROUND OF THE INVENTION

1. Field of the Invention

The present invention generally relates to electronic commerce (e-commerce) and, more particularly to electronically sharing technical information among suppliers, manufacturers and customers of a particular product development chain.

2. Background Description

In any large industry, such as the food industry, manufacturers purchase raw materials from suppliers, process the raw material to produce goods and, sell finished goods to customers. At each stage during production, volumes of data may be generated for different products, e.g., how to solve a particular manufacturing problem or, the best way to store the product. Specifications may be generated for finished products and advance sheets may be available for planned products. Since one manufacturer's finished product may be the next manufacturer's raw material, passing some or all information collected on the product may be important to both parties.

Further, audits may be required to be done on one product several times. Each audit may be at considerable expense to the party being audited. Typically, audit results are not generally available.

Currently, the food industry does not have a centralized repository that provides an all-encompassing platform for sharing technical information. This omission has created inefficiencies within the food industry because of redundancy and duplication of effort in the management and use of food-related technical information.

Thus, there is a need for providing suppliers, manufacturers and customers of a particular industry, such as the food industry, with a tool for managing and sharing specifications and other information in a standardized format.

SUMMARY OF THE INVENTION

It is therefore a purpose of the present invention to allow sharing of information between suppliers, manufacturers and customers of a large industry;

It is yet another purpose of the present invention to improve synergy and efficiency in product development in a large industry;

It is yet another purpose of the present invention to provide a collaborative approach to solving industry technical problems;

It is yet another purpose of the present invention to share supplier audit results;

It is yet another purpose of the present invention to facilitate finding food product related topical information;

It is yet another purpose of the present invention to provide a standard format for specifications that will allow sharing of information between suppliers, manufacturers and customers in the food industry;

It is yet another purpose of the present invention to facilitate collaboration on food technology among food manufacturers/suppliers, food industry service providers and customers.

The present invention is a member accessible information system for managing member information, and selectively providing member information to individual members. The members, typically belong to a common industry, such as the food industry and connect through remotely connected networked computers, such as over the Internet. Members may be food industry members including suppliers, manufacturers and customers, each accessing information supplied by members and maintained by the system. Members may search through previously authorized member provided information. The system includes a central storage which may be located on a database server and which stores product information, e.g., food product information and specifications. Members access the system through a web server. A security policy server verifies what product information and which specifications are to be available to each member. Specifications may be stored centrally or, distributed to member locations. An app server stores and selectively executes applications used by members. User security profiles are stored on and managed by a policy server. Each member's security profile indicates the level of authorization of the corresponding member. A personalization server may be included to record user member characteristics, i.e., content viewed by the member, and personalizes content to subsequently automatically make similar content available to the member. An ad server may be included to schedule, serve and track advertising content provided to members. Orders may be generated and placed automatically. Member use may be tracked to generate member bills automatically and bill individual members.

Advantageously, the preferred embodiments of the present invention provide large industries, such as the food industry, with a system having a broad platform for sharing technical information between suppliers, manufacturers and customers of the particular industry. A food product specifications are in a standard format to allow sharing of information between food industry suppliers, manufacturers and customers, thereby facilitating food product related topical information distribution. Thus, the present invention reduces redundancy and duplication of effort within the food industry eliminating inefficiency in management and use of food-related technical information. Food product development synergy and efficiency is improved, providing a collaborative approach to solving food industry technical problems.

BRIEF DESCRIPTION OF THE DRAWINGS

The foregoing and other objects, aspects and advantages will be better understood from the following detailed preferred embodiment description with reference to the drawings, in which.

DETAILED DESCRIPTION OF PREFERRED EMBODIMENTS OF THE INVENTION

Figures 1, 1A:
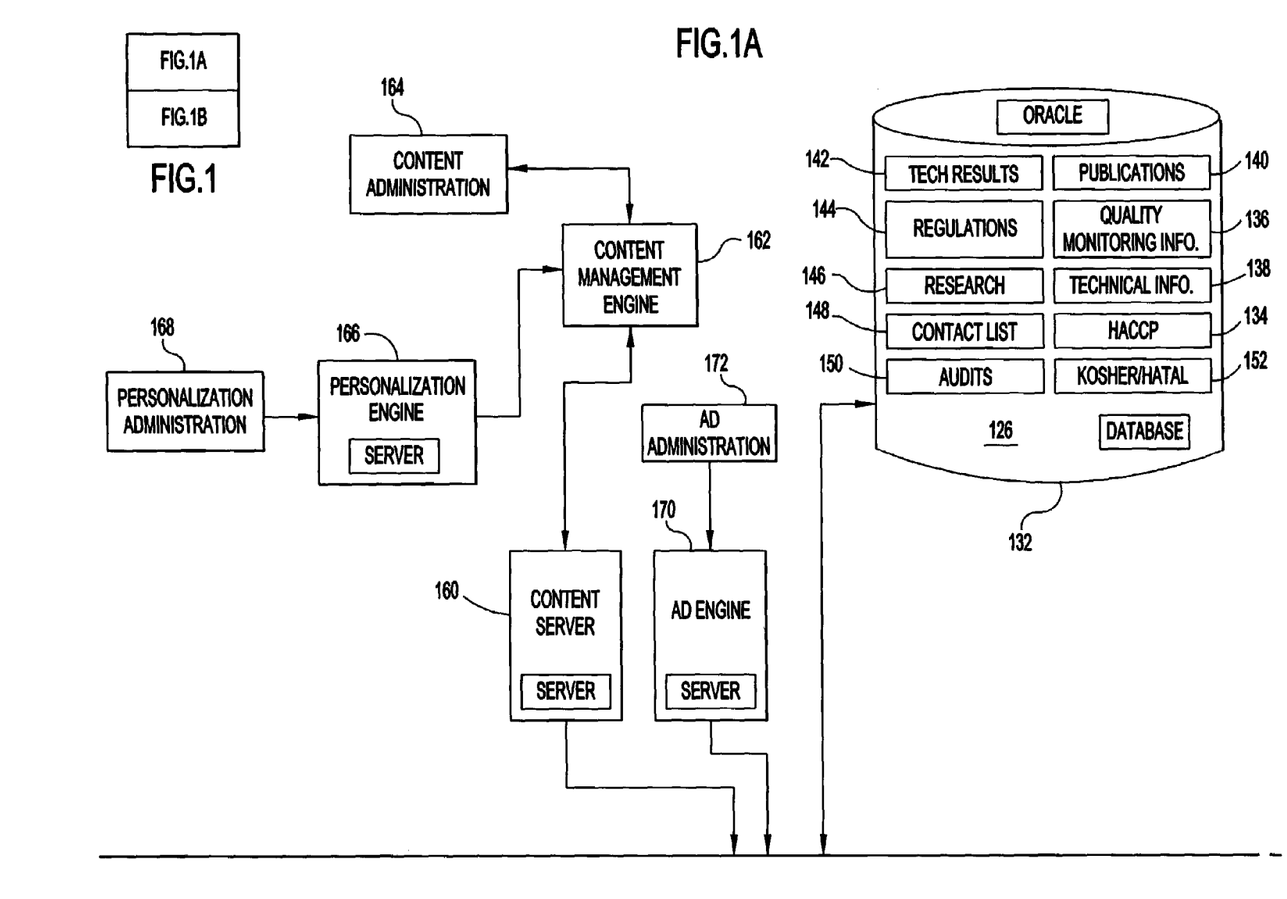
FIG. 1 shows a first preferred embodiment system with a distributed specification storage, wherein specifications are stored, locally, with individual participants.
Figure 1B:
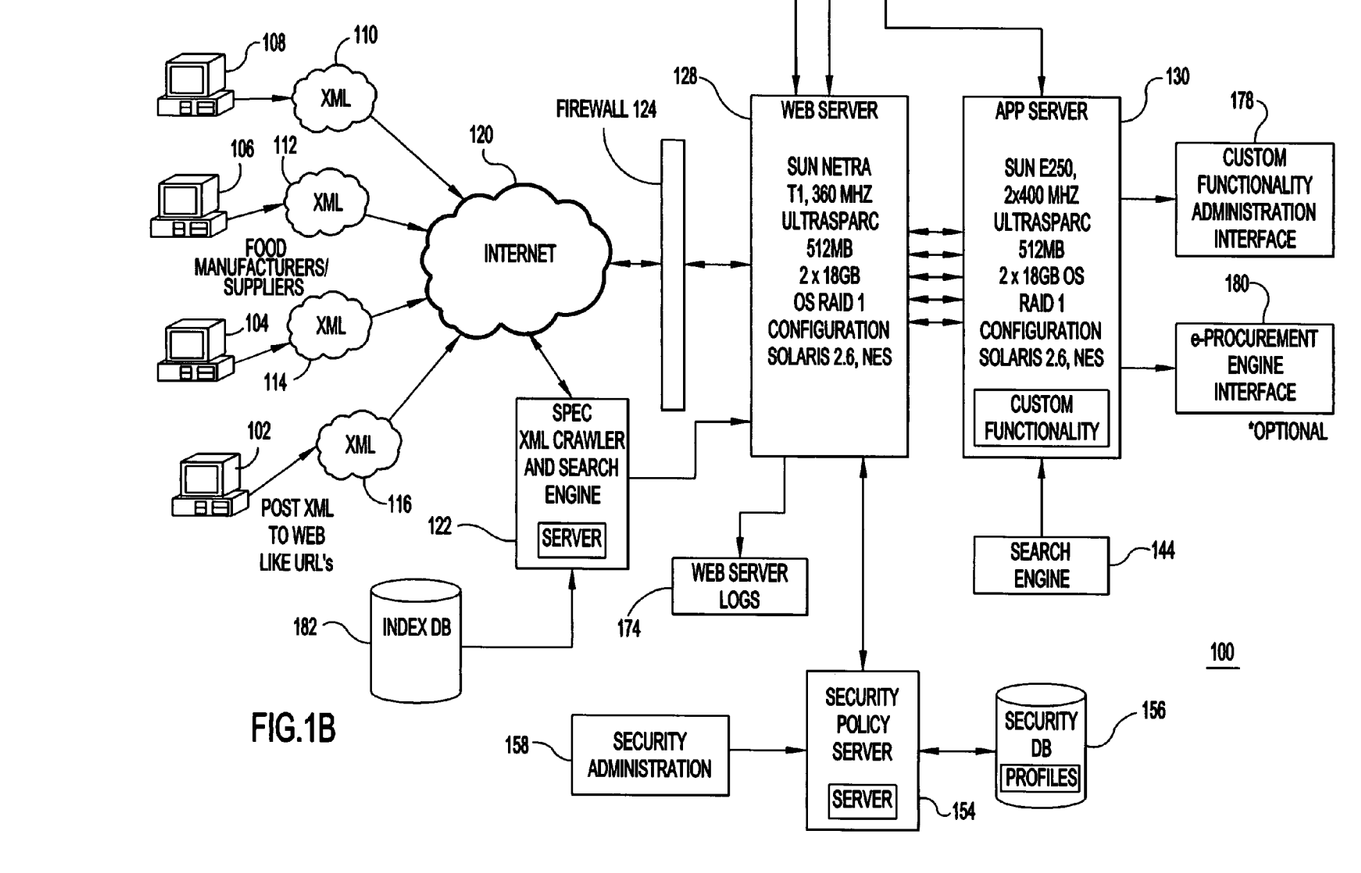

Referring now to the drawings, and more particularly, FIG. 1 shows a first preferred embodiment system 100 with a distributed specification storage, wherein specifications are stored, locally, with individual participants. A typical specification includes multiple predefined sections including a header, text, references, and property. The sections each include predefined fields which include basic data types text, number and date. Ordinarily, the system does not have a specification generation workflow component and all specifications that are submitted to the system are complete, final product specifications. It should be noted that although the preferred embodiments are described hereinbelow with reference to the food industry, this is for example only and not intended as a limitation. Thus, the system and method of the present invention may be applied any appropriate industry, e.g., the medical industry or the drug industry. Also, as used herein, participant refers to any party using or otherwise participating in the use of the system, including, but not limited to manufacturers, suppliers, service providers and any customers thereof. Further, user and participant are used interchangeably unless otherwise indicated.

So, participating manufacturers and suppliers at local terminals 102, 104, 106, and 108 post the uniform resource locator (URL) of extensible Markup Language (XML) web pages 110, 1 12, 114, 116 making related relevant information available over the network 120, e.g., the Internet. Local terminals 102, 104, 106, 108 may each be a personal computer (PC), a network computer or the participant's server. The system 100 includes an XML Crawler and Search Engine 122 searching posted specifications and other information available from industry sources. Individual participants access the central site or the system through a Firewall 124. All specifications that are accessible from the central site are XML documents and, in this embodiment, are stored on participant's web servers, e.g., 102, 104, 106 or 108, at participating client locations. Technical information and other related documents are stored, locally, in central storage 126.

A Web Server 128 stores static content (e.g., icons, images and unchanging HTML pages) that is available to participants. A suitable Web Server 128 system is the Netra t1 from Sun Microsystems, with a 360 MHz UltraSparc microprocessor, 512 MB random access memory (RAM), a 2 by 18 GB OS RAID 1 configuration, running Solaris 2.6 and NES. Examples of suitable web servers applications include Apache web server or Netscape Enterprise Server. An App Server 130 executes functional applications stored thereon, e.g., training modules in PowerPoint, enhanced searching capability. The particular applications are customized as required for the particular on site requirements. A suitable App Server 128 is a E250 from Sun Microsystems, with two 400 MHz UltraSparc microprocessors, 512 MB random access memory (RAM), a 2 by 18 GB OS RAID 1 configuration, running Solaris 2.6 and NES. Websphere from IBM Corporation and Netscape iPlanet are examples of suitable App Servers 130.

A Database Server 132 includes central storage 126 and manages product information as well as procedures and functions stored therein. Oracle 8i Enterprise Edition is a suitable database server 132. Information that may be stored on the database server 132 includes, for example, links and indexes for XML documents previously found by the crawler, certificates of analysis for various products, Hazard Analysis Critical Control Point (HACCP) templates and documents 134, quality monitoring documents 136, and various relevant technical papers 138. Also, product related publications 140, technical information 142, governing regulations 144, ongoing research lists 146, as well as contact lists 148 may be included. In addition, audit results 150 for various products and Kosher/Halal compliance testing 152 may be included.

A Security Policy Server 154 maintains user security profiles in a security database 156 entered through a Security Administration interface 158. Security profiles may include such things as company name and position (e.g., marketing representative, buyer, etc.), products supplied or manufactured and any basic requirements. Netegrity Siteminder is suitable Security Policy Server 154. The Security Policy Server 154 manages resource access insuring that participating users receive access only to authorized resources while protecting unauthorized resources and application functions.

A Content Server 160, such as Interwoven or the Vignette Content Server, interfaces between the Web Server 128 and a Content Management Engine 162. A Content Administration Interface 164 allows a content manager, editor and/or writers to input content that is identified, gathered, organized and prepared for the site. Content may be in the form of text, financial data or images and can include help screen information, section introductions, periodical articles, streaming content, etc. The Content Management Engine 162 also provides content management, workflow and delivery. Content Management Engine 162 also interfaces with Personalization Engine/Server 166, which personalizes each user's web experience. Content and navigation characteristics dynamically extracted from searches performed by the particular user and adapted for the user. A Personalization Administration interface 168 allows an administrator to enter, remove or modify personalization as deemed necessary.

An Ad Engine/Server 170, e.g., from Engage, manages, schedules, targets, serves and tracks advertising content. Banner ads may be displayed to participants at various points (e.g., upon logging in, during use, upon logging out, etc.) For a source of additional income and/or to help defray operating costs. Accordingly, an Ad Administration interface 172 is included for providing advertisements and administering to ad content.

Web Server Logs 174 are included for logging and tracking system activity, in particular for tracking member/participant use and in generating bills based on such use. A search engine 176 with full indexing and search capability is included for searching documents stored in the central site and, in particular, in the central storage 126 through the App Server 130. The Verity Information Server is a suitable search engine 176. Also, a Custom Functionality Administration Interface 178 is included for selectively administering to system unique features provided in custom functional applications of the App Server 130. Optionally, an e-Procurement Engine interface 180 may be included for conducting transactions interactively amongst participants. Transactions may include things such as ordering materials (e.g., from an automatically generated bill of materials), selling products, shipping, billing member/participants and collecting payments electronically. Participants may also be billed for system use.

Regarding XML Crawler and Search Engine 122, the XML crawler continuously searches for completed XML specification documents and indexes any newly encountered XML documents storing the search results in Index Server 182. In this first embodiment, the index and links for the XML documents are stored in the Index Server 182 at the central site; however, as noted above, the actual XML documents are stored on web servers 102, 104, 106, 108 of participating clients. So, in response to a search request, the XML search engine searches through indexed documents listed in Index Server 182, selects documents matching search criteria and retrieves selected XML documents from the particular participant's server 102, 104, 106, 108. Thunderstone or Ultraseek are a suitable crawler and search engine combination 122. Participants must provide a local web server (which may also be the participant's point of entry 102, 104, 106, 108 to the system) where XML documents are archived and accessible by the XML crawler in order to participate in the first embodiment system 100.

XML specifications may be manually formatted as XML documents or, generated automatically from a non-XML format specification. Typically, specifications are stored, currently, as text or in a relational database form and parsed information may include sections for a header, a reference, property and text. An application programming interface (API) may be created to perform automatic specification migration from data organized into predefined fields. After parsing data, a participant provides the parsed data in predefined specification textual fields that may include time/data stamps. The API then converts the parsed data to an XML document.

Figures 2, 2A:
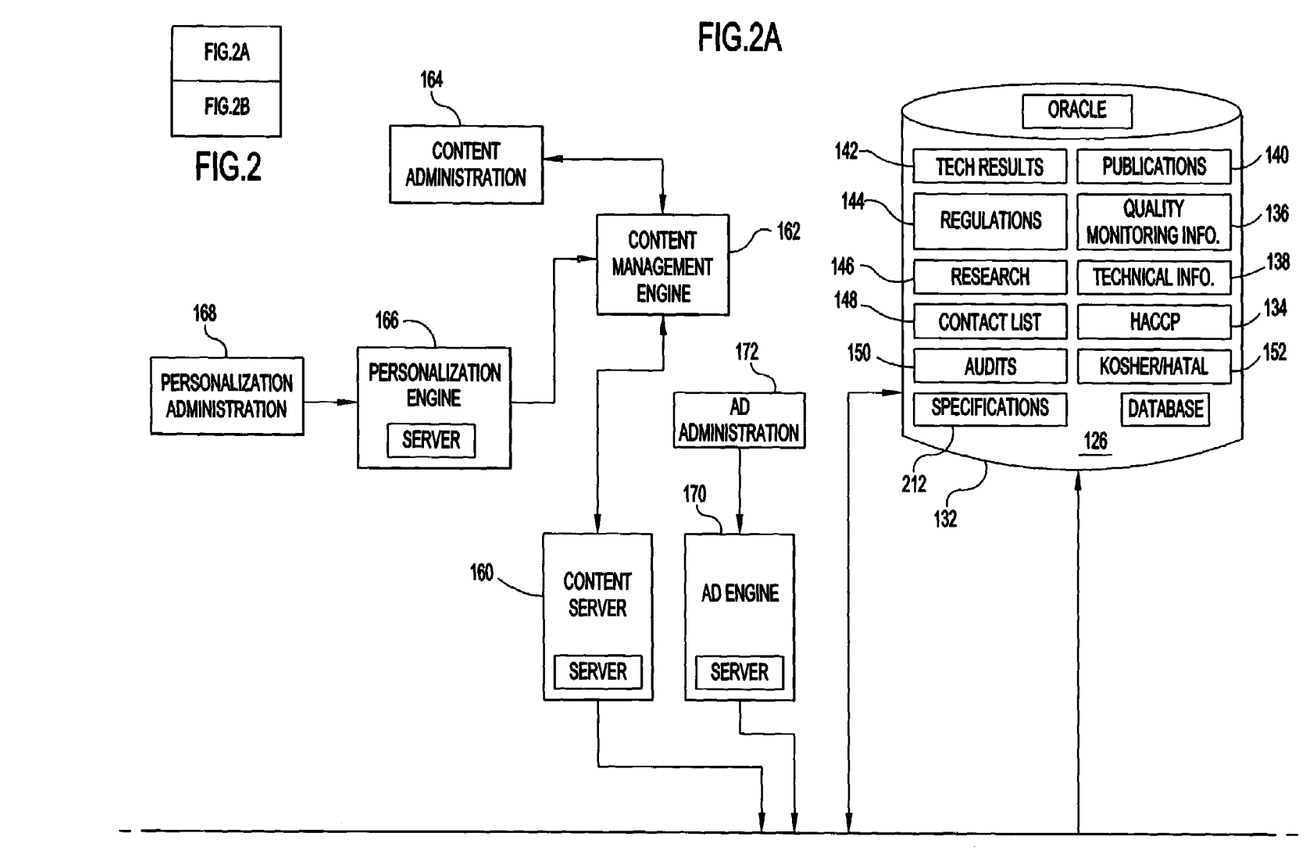
FIG. 2 is an example of a second preferred embodiment that, unlike the first preferred embodiment, includes a centralized specification storage with all searchable specifications being stored on the central site.
Figure 2B:
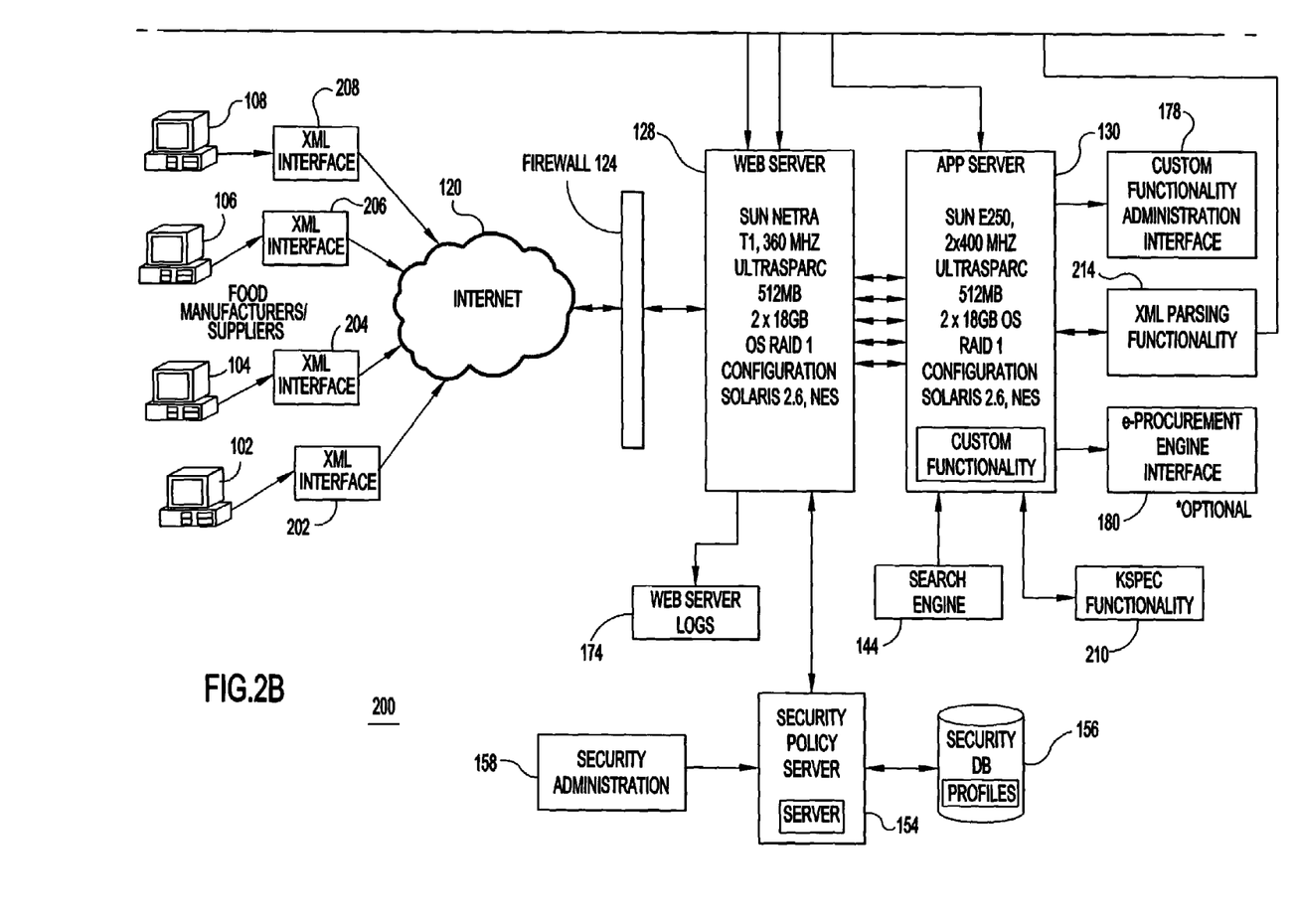

FIG. 2 is an example of a second preferred embodiment 200 that is substantially similar to the first embodiment 100 but, unlike the first preferred embodiment, includes a centralized specification storage with all searchable specifications being stored on the central site. In this embodiment, individual participating customers or partners are responsible for transforming existing specifications into a defined format as directed by the central site. Transformed specifications are then provided for storage at the central site. Since this second embodiment 200 is substantially similar to the first embodiment, like elements are numbered identically and reference is made to their description hereinabove.

Since specifications are stored centrally in this embodiment 200, the XML crawler and search engine 122 is unnecessary and, so, is omitted. Further, data is exchanged with participants at local terminals 102, 104, 106, 108 through an XML-based API 202, 204, 206, 208. Thus, in addition to the elements in common with the first embodiment 100, the second preferred embodiment system includes: an XML-based API 202, 204, 206, 208 that allows participating customers/partners to exchange data; a specification creation tool 210 that can be useable, especially by smaller businesses, for creating specifications; and, specification storage 212 for storing specifications in the central database 132. Participants can transfer their completed specifications in XML format to the central database 126 using the XML based API.

To compensate for any additional load that must be bourne by the central site, in this second embodiment 200, two servers may be used for each of the Web Server 128, the App Server 130 and the database server 132. Two servers provide better load distribution for each of the Web Server 128 and the App Server 130. Also, two servers operating in parallel are better able to handle the storage demands placed on database server 132 by centrally storing specifications. In addition, unlike the first preferred embodiment 100, the second embodiment 200, also includes an automatic specification generation tool 210 for participants' convenience. XML specifications are stored in specification storage 212. Data stored in the central storage 126 may be parsed in XML parser 214 for incorporation in XML specifications. Thus, companies that may not own a specification generation tool can automatically create XML specification documents in this embodiment 200, rather than manually or by other more taxing means as may be necessary in the first preferred embodiment 100.

The specification generation tool 210 reads specification data from the original repository and parses the data for each specification into relevant data fields. Parsed data may also be extracted from central storage 126. Then, XML documents are generated from the parsed data. The format of the XML document is validated. Valid documents are stored in the specification storage 212.

Figures 3, 3A:
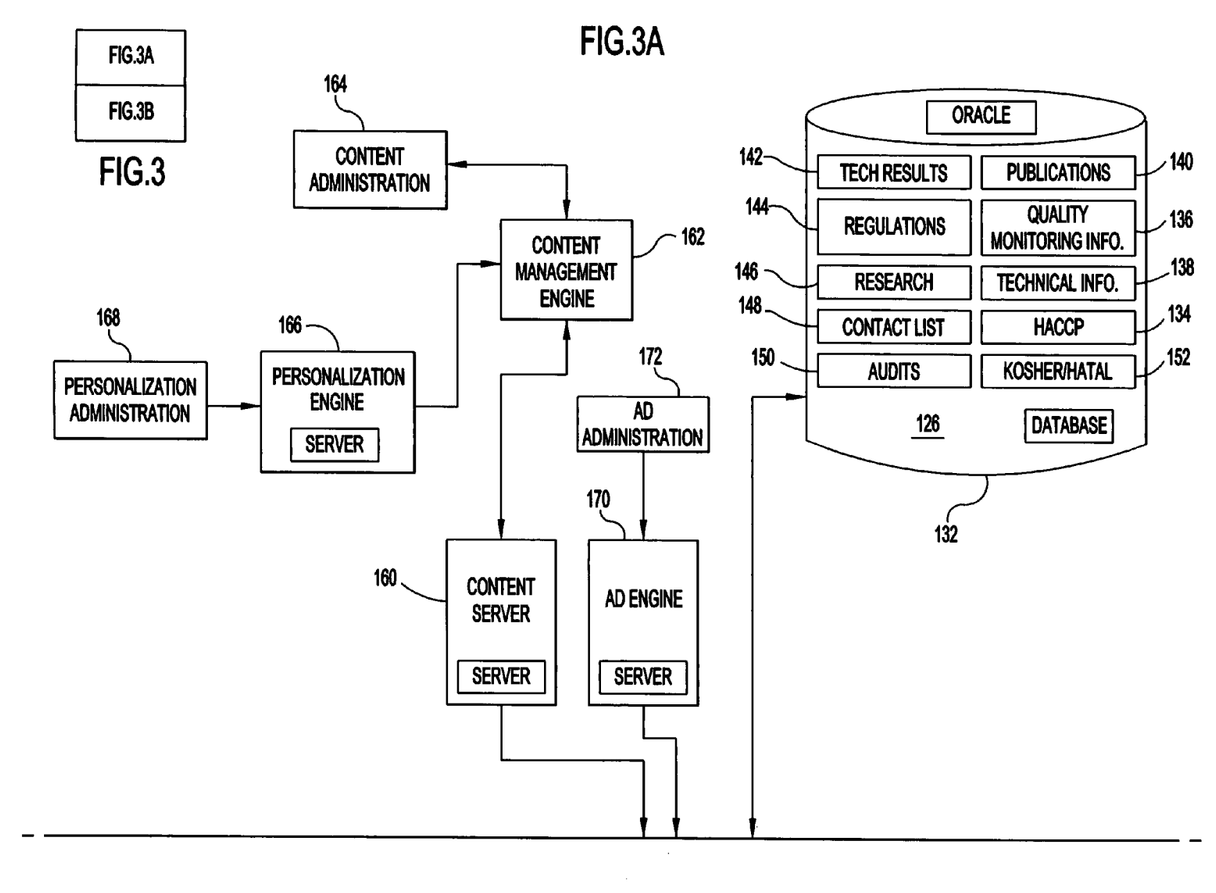
FIG. 3 shows a third preferred embodiment that includes aspects of both the first and second preferred embodiments.
Figure 3B:
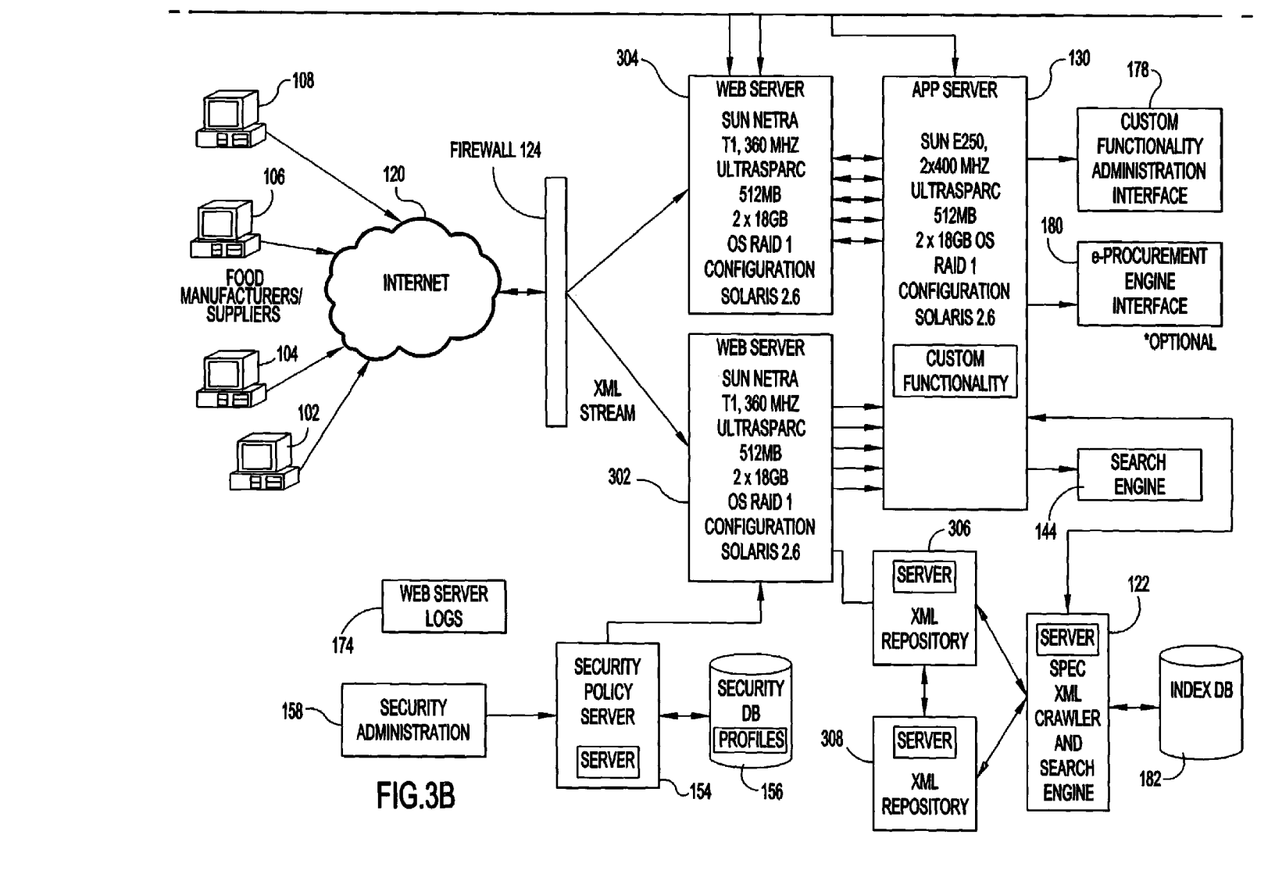

FIG. 3 shows an example of a third preferred embodiment 300 that includes aspects of both the first and second preferred embodiments. In this embodiment specifications are stored both locally at participants' locations and centrally at the central site. The centralized web server function of web server 128 in the first embodiment 100 is distributed onto two identical independent web servers 302, 304. Both web servers 302, 304 are connected between Firewall 124 and App Server 130. However, Content Server 160 and Ad Server 170 are connected only to web server 304, while Security Policy Server 154 is connected only to web server 302. Neither web server 302 or 304 communicates directly with the other's corresponding connected services 154, 160 and 170. The third preferred embodiment 300 also includes on-site XML document storage 306, 308 similar to that of the second embodiment 200, with documents stored in centrally located storage 306, 308 instead of being distributed at individual participants' web addresses or URL. Web server 302 is also connected directly to XML Repository 306 and indirectly to second XML Repository 308 through XML Repository 306. As noted above, this third embodiment 300 is a hybrid of the first two embodiments 100, 200 and, so, includes a specifications XML Crawler and Search Engine 122. XML Repositories 306, 308 are therefore, connected between web server 302 and spec XML Crawler and Search Engine 122.

Thus, participants individually using terminals 102, 104, 106, 108 can log in through the Internet 120, through Firewall 124 to web servers 302, 304, retrieving stored information and passing documents and other information to the system 300. Requests for XML related services, such as searches, are passed through web server 302 to App Server 130 and then, to XML Crawler and Search Engine 122. Content management, workflow and characteristics of content tracking are interfaced through web server 304.

Advantageously, the preferred embodiments of the present invention provide large industries, such as the food industry, with a system having a broad platform for sharing technical information between suppliers, manufacturers and customers of the particular industry. Food product specifications are in a standard format to allow sharing of information between authorized food industry suppliers, manufacturers and customers, thereby facilitating food product related topical information distribution. Audit results may be stored and made available as XML documents, thereby, reducing food product audit costs. Thus, the present invention reduces redundancy and duplication of effort within the food industry eliminating inefficiency in management and use of food-related technical information. Food product development synergy and efficiency is improved, providing a collaborative approach to solving food industry technical problems.

While the invention has been described in terms of preferred embodiments, those skilled in the art will recognize that the invention can be practiced with modification within the spirit and scope of the appended claims.

I claim:

1. A member accessible information system for managing member information regarding products, and selectively providing the member information to individual members, said system comprising:
    a plurality of remotely connected computers connected together over a network, wherein member information regarding products is accessible by members over ones of said remotely connected computers, and wherein at least some member information regarding at least one product resides within at least one of the remotely connected computers;

means for maintaining said member information regarding products including a database server storing said member information regarding products, said database server managing said stored member information and providing selected portions of said member information regarding products responsive to appropriate requests from authorized members;

means for searching through member information regarding products responsive to an information request from a member; and means for selectively allowing members to request said member information regarding products.

2. A member accessible information system as in claim 1, wherein the means for selectively allowing members to request member information regarding products comprises:

login means for receiving a member identification and corresponding password and, providing a logging-in member portions of said member information responsive to a request.

3. A member accessible information system as in claim 1, wherein the means for maintaining member information regarding products further comprises:

a webserver storing static content information and serving said static content to members;

an appserver storing applications for use by members and selectively executing stored applications responsive to selected requests from members; and a policy server storing user security profiles and managing said stored user security profiles, each of said members' security profile indicating a level of authorization of a corresponding member.

4. A member accessible information system as in claim 1, wherein the means for searching member information regarding products comprises:

a search engine having full text indexing and searching capability for searching member supplied documents regarding products stored in said system; and a crawler searching and indexing searched said member supplied documents regarding products, said search engine searching and retrieving documents regarding products indexed by said crawler responsive to member requests.

5. A member accessible information system as in claim 1, wherein said system further comprises a personalization server, said personalization server recording characteristics of content viewed by members and personalizing content, personalized content automatically being made available to corresponding members thereafter.

6. A member accessible information system as in claim 1, said system further comprising an ad server providing advertising content to members.

7. A member accessible information system as in claim 6, wherein said ad server manages ad content scheduling, serving and tracking.

8. A member accessible information system as in claim 1 further comprising:

billing means for tracking member use, deriving member bills from member use and billing individual ones of said members.

9. A member accessible information system as in claim 8, said billing means collecting revenues from billed members.

10. A member accessible information system as in claim 1, wherein members of said system are members of a common industry.

11. A member accessible information system as in claim 10, wherein members of said common industry include suppliers, manufacturers and customers.

12. A member accessible information system as in claim 11, wherein said common industry is the food industry.

13. A member accessible information system as in claim 1, wherein member information regarding products is stored on member computers, member computers being ones of said remotely connected computers.

14. A member accessible information system as in claim 1, wherein at least a portion of said member information regarding products is located on a central computer with a database server.

15. An information management system for managing product information distribution, said system comprising:

a central storage storing product information for products related to a common industry wherein said central storage is on a database server, said database server storing and managing member information and providing selected stored information responsive to appropriate requests from authorized members;

a web server interfacing members with selected product information stored in said central storage and as stored in remotely connected computers through which members interface to the information management system;

a security policy server, selecting product information available to each member;

an app server storing applications for use by members and selectively executing stored applications responsive to selected member requests from said web server;

a policy server storing user security profiles and managing said stored user security profiles, each of said members' security profile indicating a level of authorization of a corresponding member;

a personalization server recording characteristics of content viewed by members and personalizing content, personalized content automatically being made available to corresponding members thereafter; and a specification storage storing specifications for ones of said products, stored said specifications being selectively provided to ones of said interfacing members.

16. An information system as in claim 15 further comprising an ad server providing advertising content to members.

17. An information system as in claim 16, said ad server scheduling, serving and tracking ad content.

18. An information system as in claim 15 further comprising a billing unit tracking member use, deriving member bills from member use and billing individual ones of said members.

19. An information system as in claim 18, wherein said billing unit collects revenues from billed members.

20. An information system as in claim 18, wherein members of said system are members of the food industry.

21. An information system as in claim 20, wherein said food industry members include suppliers, manufacturers and customers.

22. An information system as in claim 18, wherein one or more specifications are stored on member computers, member computers being remotely connected to said information system, the location of remotely stored said specifications being stored on said information system.

23. An information system as in claim 22 further comprising:

a search engine having full text indexing and searching capability for searching member supplied documents stored in said central storage; and a crawler searching and indexing searched said member supplied documents, said search engine searching and retrieving documents indexed by said crawler responsive to member requests.

24. An information system as in claim 22, wherein one or more specifications are stored in said central storage.

25. An information system as in claim 18, wherein one or more specifications are stored in said central storage.

26. An information management system for managing product information distribution, said system comprising:

a central storage storing product information for products related to a common industry;

a web server interfacing members with selected product information stored in said central storage and as stored in remotely connected computers through which members interface to the information management system;

a security policy server, selecting product information available to each member;

a billing unit tracking member use, deriving member bills from member use and billing individual ones of said members;

a search engine having full text indexing and searching capability for searching member supplied documents stored in said central storage; and a crawler searching and indexing searched said member supplied documents, said search engine searching and retrieving documents indexed by said crawler responsive to member requests;

a specification storage storing specifications for ones of said products, stored said specifications being selectively provided to ones of said interfacing members; and wherein one or more specifications are stored on member computers, member computers being remotely connected to said information system, the location of remotely stored said specifications being stored on said information system.

27. An information system as in claim 26, further comprising:

an app server storing applications for use by members and selectively executing stored applications responsive to selected member requests from said web server; and a policy server storing user security profiles and managing said stored user security profiles, each of said members' security profile indicating a level of authorization of a corresponding member.

28. An information system as in claim 27, wherein said central storage is on a database server, said database server storing and managing member information and providing selected stored information responsive to appropriate requests from authorized members.

29. An information system as in claim 28 further comprising an ad server providing advertising content to members.

30. An information system as in claim 29, said ad server scheduling, serving and tracking ad content.

31. An information system as in claim 26 wherein said billing unit collects revenues from billed members.

32. An information system as in claim 26, wherein members of said system are members of the food industry.

33. An information system as in claim 32, wherein said food industry members include suppliers, manufacturers and customers.

34. An information system as in claim 26, wherein one or more specifications are stored in said central storage.

* * * * *

UNITED STATES PATENT AND TRADEMARK OFFICE
CERTIFICATE OF CORRECTION

| | | |
|---|---|---|
| PATENT NO. | : 7,024,391 B2 | Page 1 of 1 |
| APPLICATION NO. | : 09/730144 | |
| DATED | : April 4, 2006 | |
| INVENTOR(S) | : Burich | |

It is certified that error appears in the above-identified patent and that said Letters Patent is hereby corrected as shown below:

ON THE TITLE PAGE:

(56)  At entry 1 of Foreign Patent Documents, after "10/1998," insert --G06F 17/60--.

Signed and Sealed this

Seventeenth Day of October, 2006

JON W. DUDAS
*Director of the United States Patent and Trademark Office*